US008599837B2

(12) United States Patent
Kyle

(10) Patent No.: US 8,599,837 B2
(45) Date of Patent: Dec. 3, 2013

(54) LOCAL IDENTITY BASED ON CALLED NUMBER

(75) Inventor: Andre B. Kyle, Mandeville, LA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 112 days.

(21) Appl. No.: 13/299,386

(22) Filed: Nov. 18, 2011

(65) Prior Publication Data

US 2013/0128879 A1    May 23, 2013

(51) Int. Cl.
*H04L 12/66* (2006.01)
(52) U.S. Cl.
USPC ........... 370/352; 370/356; 370/353; 370/354; 370/355; 379/142.04; 379/142.1; 379/142.02; 379/256.11
(58) Field of Classification Search
USPC .................. 370/352–356; 379/142.1, 142.04, 379/142.02, 256.11
See application file for complete search history.

(56) References Cited

U.S. PATENT DOCUMENTS

| 2003/0128833 | A1* | 7/2003 | Peters ...................... 379/265.09 |
| 2007/0127703 | A1* | 6/2007 | Siminoff ...................... 379/372 |
| 2007/0263819 | A1* | 11/2007 | Finkelman et al. ...... 379/201.11 |
| 2008/0253362 | A1* | 10/2008 | Samarasinghe et al. ...... 370/352 |
| 2008/0313039 | A1* | 12/2008 | Altberg et al. .................. 705/14 |
| 2009/0187971 | A1* | 7/2009 | Bao et al. .......................... 726/3 |
| 2009/0274284 | A1* | 11/2009 | Arsenault et al. .......... 379/142.1 |
| 2010/0150337 | A1* | 6/2010 | Chen et al. ............... 379/265.02 |
| 2010/0172345 | A1* | 7/2010 | Bjorsell et al. ................ 370/352 |
| 2011/0081009 | A1* | 4/2011 | Ma et al. .................. 379/142.04 |
| 2011/0164534 | A1* | 7/2011 | Vaishnavi et al. ............. 370/259 |
| 2012/0051267 | A1* | 3/2012 | Ma et al. ....................... 370/259 |

* cited by examiner

*Primary Examiner* — Asad Nawaz
*Assistant Examiner* — Khaled Kassim

(57) ABSTRACT

Methods, devices, and storage media provide for receiving a message pertaining to a telephone call set-up; identifying in the message a called telephone number; selecting a calling telephone number based on the called telephone number; replacing a calling telephone number included in the message with the selected calling telephone number; and transmitting the message that includes the selected calling telephone number.

21 Claims, 9 Drawing Sheets

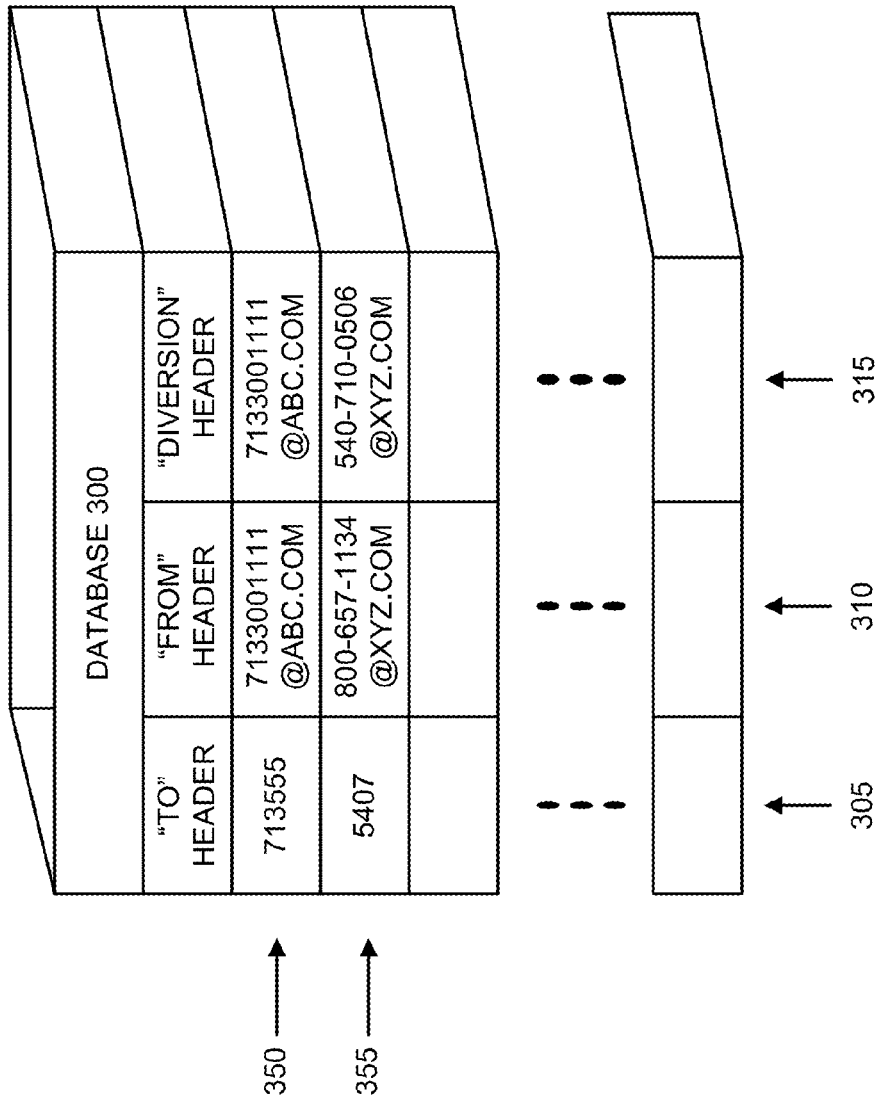

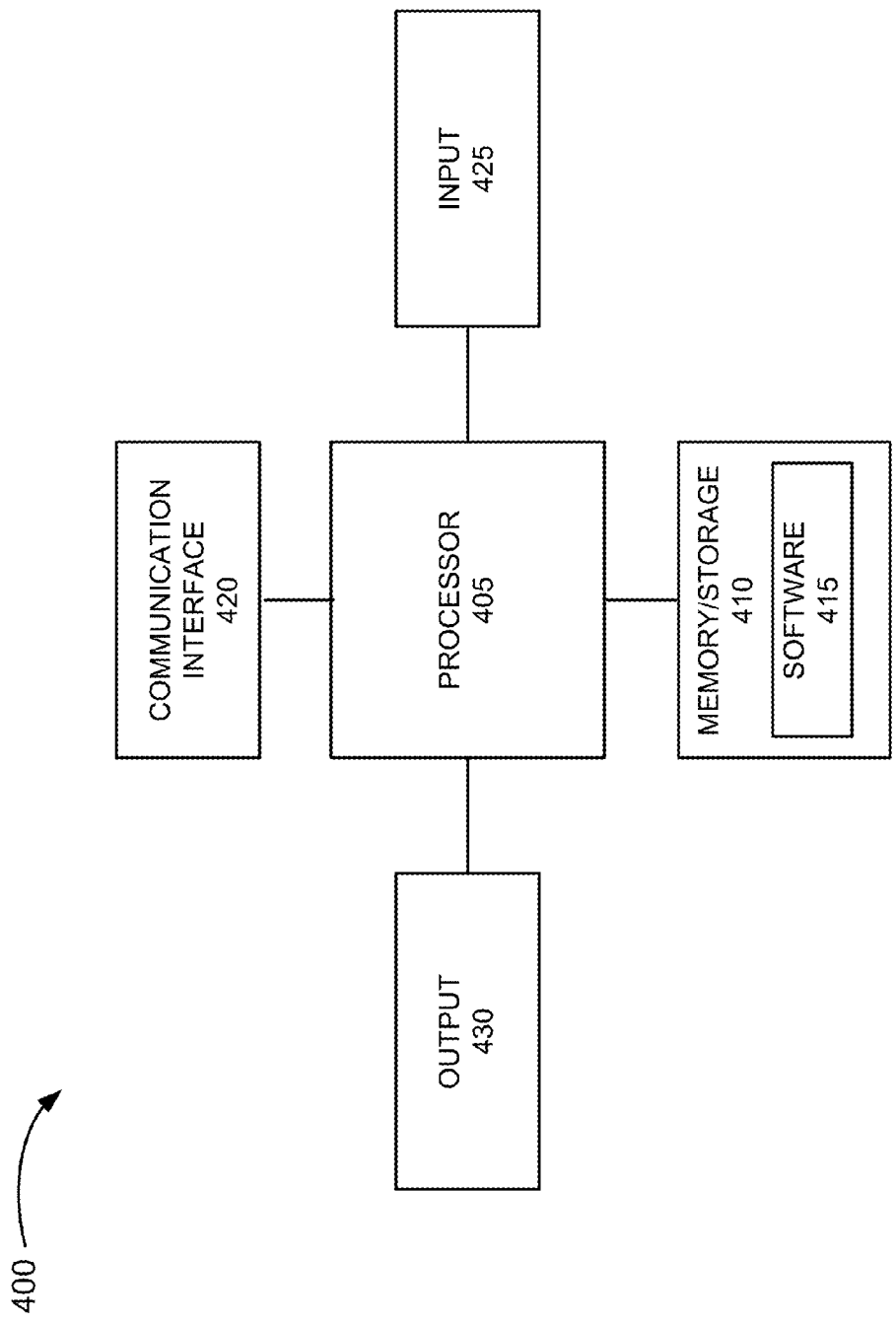

LOCAL IDENTITY BASED ON CALLED NUMBER

BACKGROUND

A company may use an enterprise network that includes an Internet Protocol Private Branch Exchange (IP PBX) to provide various services, such as telephony, messaging, presence, and video. The company may also use a Session Initiation Protocol (SIP) trunking service to connect to a traditional phone system, such as a Public Switched Telephone Network (PSTN).

BRIEF DESCRIPTION OF THE DRAWINGS

FIG. 3B is a diagram illustrating exemplary data in the database according to the exemplary scenario depicted in FIGS. 2A-2C;

FIG. 4 is a diagram illustrating exemplary components of a device that may correspond to one or more of the devices in the environment depicted in FIG. 1.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

According to an exemplary embodiment, a network device receives a call setup message and replaces an existing calling number with a substitute calling number. The network device selects the substitute calling number based on the called number. For example, the substitute calling number may be a local telephone number relative to the called number. In this regard, the called party receiving the call will consider the calling party as having a local presence. Also, the calling party may be billed based on the substitute calling number.

According to an exemplary implementation, the call setup message may be a Session Initiation Protocol (SIP) invite message. According to other implementations, the call setup message may be message based on some other format and/or protocol (e.g., H.323, Extensible Markup Language Protocol (XMPP), Skinny Call Control Protocol (SCCP), Internet Protocol (IP), etc.). According to an exemplary implementation, the substitute calling number may be a screened telephone number (STN) or an unscreened telephone number to be delivered as an Automatic Number Identification (ANI).

Figure 1:
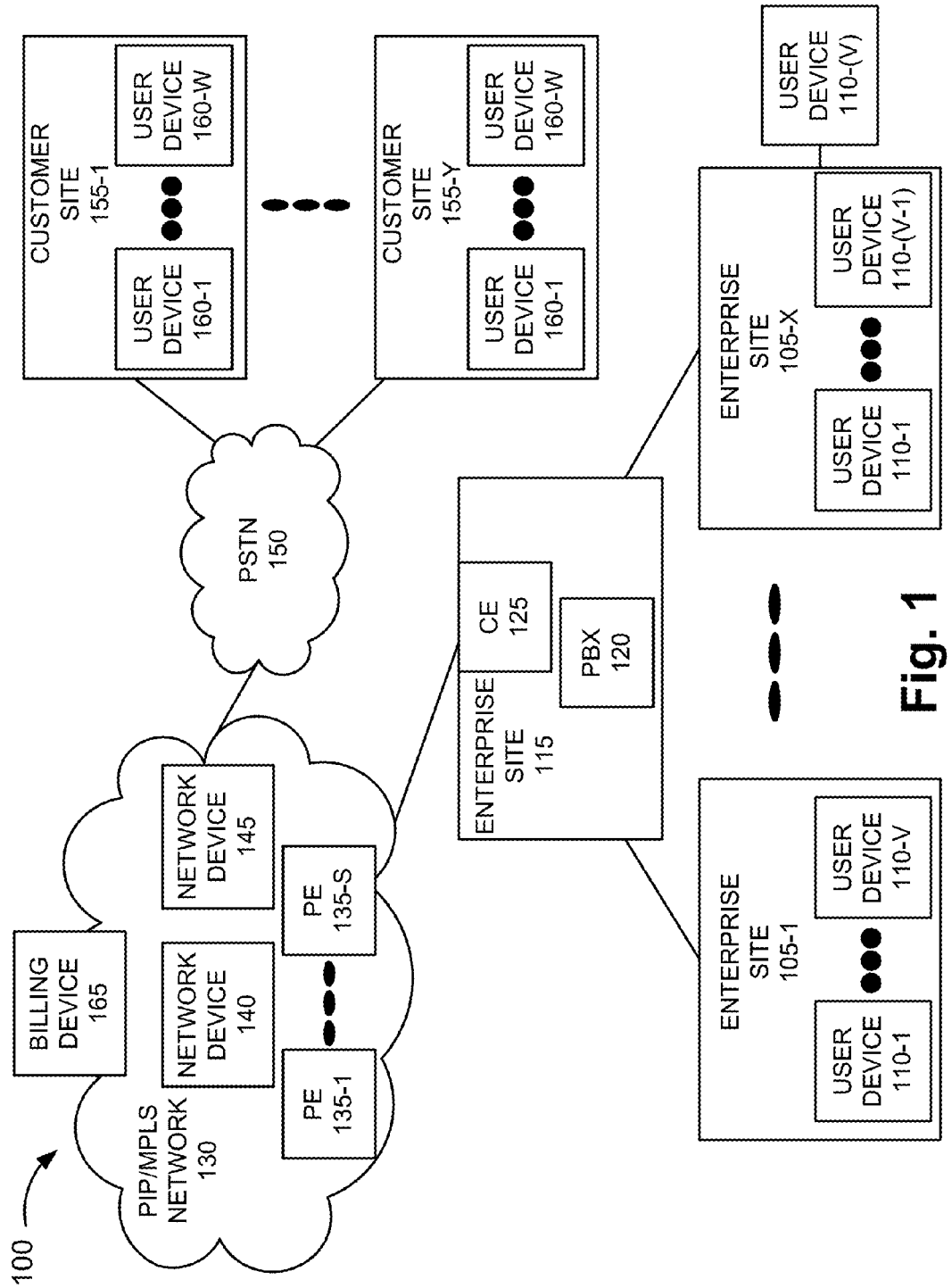
FIG. 1 is a diagram illustrating an exemplary environment in which an exemplary embodiment for providing local identity based on a called number may be implemented.

FIG. 1 is a diagram illustrating an exemplary environment in which an exemplary embodiment for providing local identity based on a called number may be implemented. As illustrated, environment 100 includes enterprise sites 105-1 through 105-X, in which X>1 (referred collectively as enterprise sites 105 or individually as enterprise site 105). Enterprise site 105 includes user devices 110-1 through 110-V, in which V>1 (referred collectively as user devices 110 or individually as user device 110). As further illustrated, environment 100 includes an enterprise site 115 that includes a PBX 120 and a customer edge (CE) device 125. Environment 100 also includes a trunking network (e.g., a SIP trunking network, etc.) deployed over a private IP/Multiprotocol Label Switching (PIP/MPLS) network 130 that includes provider edge (PE) devices 135-1 through 135-S, in which S>1 (referred to collectively as provider edge devices 135 or individually as provider edge device 135), a network device 140, a network device 145, and a billing device 165. Additionally, environment 100 includes a public switched telephone network 150, and customer sites 155-1 through 155-Y, in which Y>1 (referred to collectively as customer sites 155 or individually customer site 155) that include user devices 160-1 through 160-W, in which W>1 (referred to collectively as user devices 160 or individually as user device 160).

The number of devices and the configuration in environment 100 are exemplary and provided for simplicity. According to other embodiments, environment 100 may include additional devices, fewer devices, different devices, and/or differently arranged devices, than those illustrated in FIG. 1. Additionally, the number and type of networks in environment 100 are exemplary and provided for simplicity.

According to other embodiments, a single device in FIG. 1 may be implemented as multiple devices and/or multiple devices may be implemented as a single device. A device may be implemented according to a centralized computing architecture, a distributed computing architecture, or a cloud computing architecture. Additionally, a device may be implemented according to one or multiple network architectures (e.g., a client device, a server device, a peer device, or a combination thereof).

Also, according to other embodiments, one or more functions and/or processes described as being performed by a particular device may be performed by a different device, or some combination of devices. Environment 100 may be implemented to include wired and/or wireless connections among the devices illustrated.

Enterprise site 105 is a location associated with a company or a business. User device 110 includes a telephone. For example, the telephone may be implemented as a PBX telephone. According to an exemplary implementation, a user may be able to access PBX 120, via user device 110, on-site (e.g., enterprise site 105). According to another exemplary implementation, a user may be able to access PBX 120, via user device 110, off-site.

Enterprise site 115 is a location associated with a company or a business. PBX 120 includes a device that provides telephone switching service(s). According to an exemplary implementation, PBX 120 is an IP PBX. PBX 120 may serve as a common access point for calls. CE device 125 includes a network device that connects enterprise site 115 to PIP/MPLS network 130. According to an exemplary implementation, CE device 125 is a customer edge router.

PIP/MPLS network 130 is a PIP/MPLS network. According to an exemplary implementation, PIP/MPLS network 130 includes a trunking network (e.g., SIP, etc.). PE device 135 includes a network device that connects PIP/MPLS network 130 to enterprise site 115. According to an exemplary implementation, PE device 135 is a provider edge router.

Network device 140 includes a network device that provides a local identity based on a called number service. According to an exemplary implementation, network device 140 includes a device that hosts an application server. According to other implementations, network device 140 may be implemented as another type of network device (e.g., a PBX, a switch, etc.) that is in a call setup path. According to an exemplary implementation, network device 140 may provide a SIP trunking service.

Network device 145 includes a network device that connects PIP/MPLS network 130 to PSTN 150. According to an exemplary implementation, network device 145 is a gateway device.

Billing device 165 includes a network device that collects and processes billing information. PSTN 150 includes a voice or a telephone network. According to an exemplary implementation, PSTN 150 is a traditional public circuit-switched telephone network.

Customer site 155 is a location associated with a user of user device 160. User device 160 includes a telephone or other type of telephony device (e.g., a mobile device, etc.).

Figure 2A:
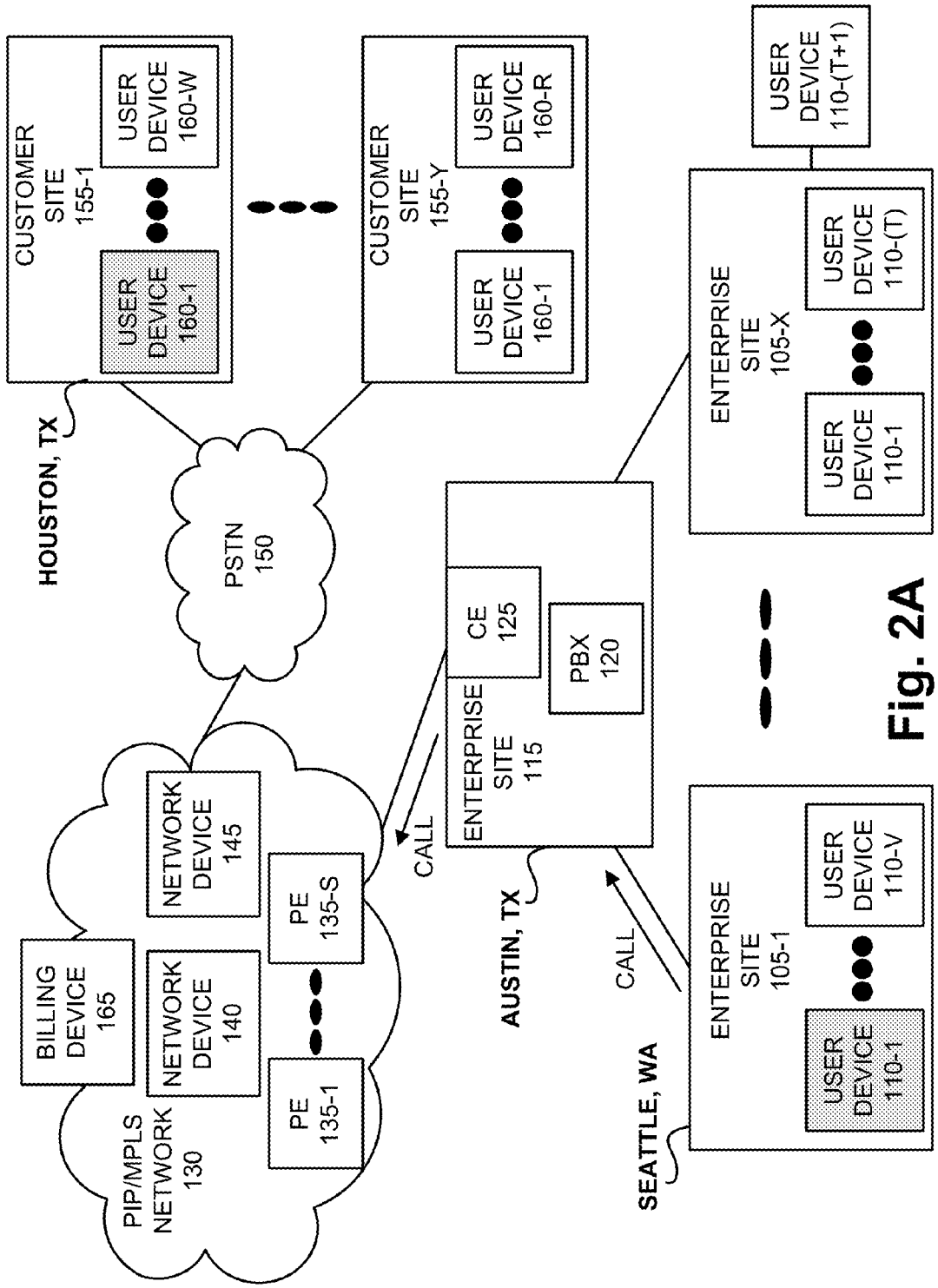
FIGS. 2A-2C illustrate an exemplary scenario in which local identity based on a called number may be provided in the environment depicted in FIG. 1.
Figure 2B:
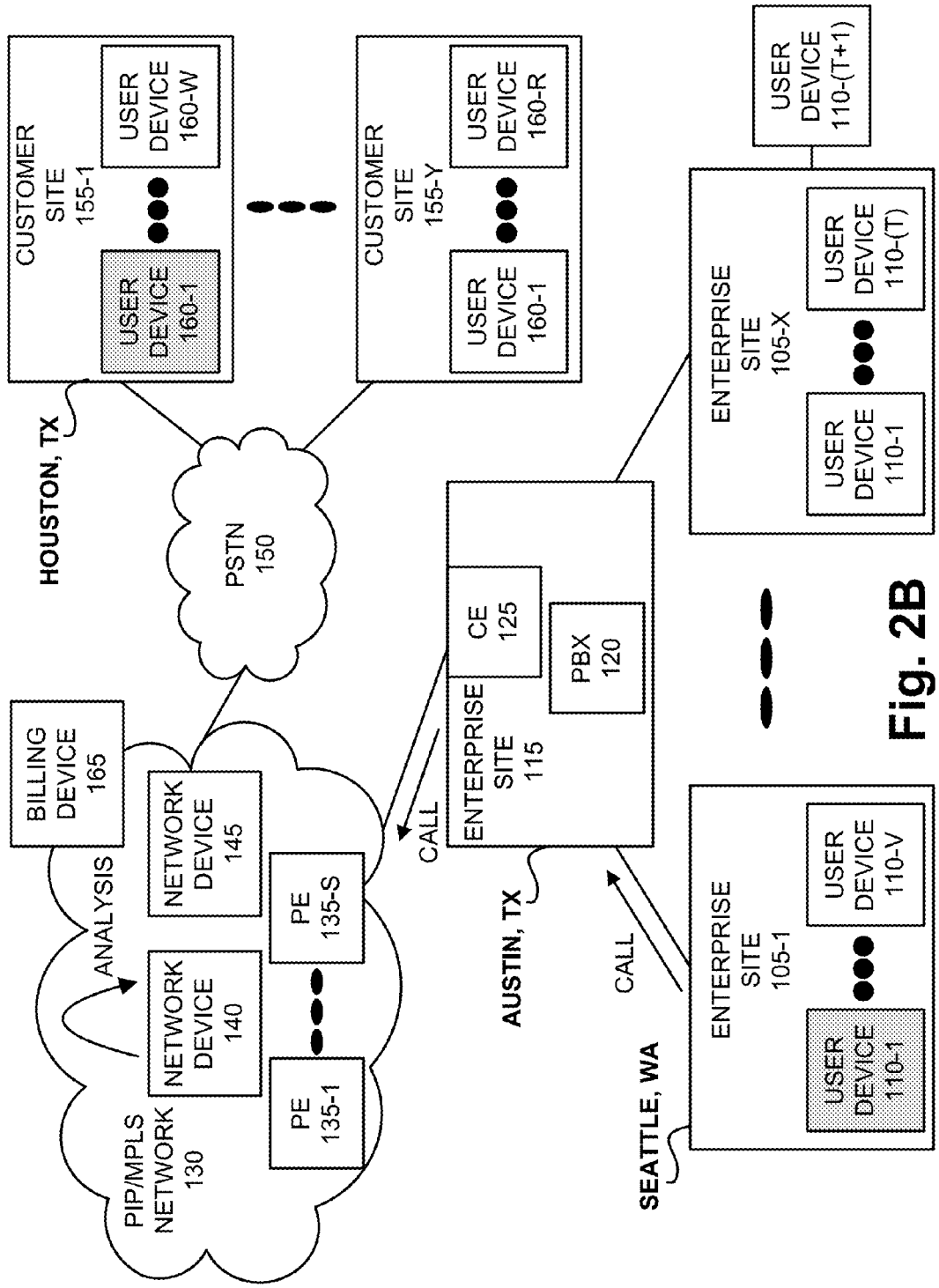
Figure 2C:
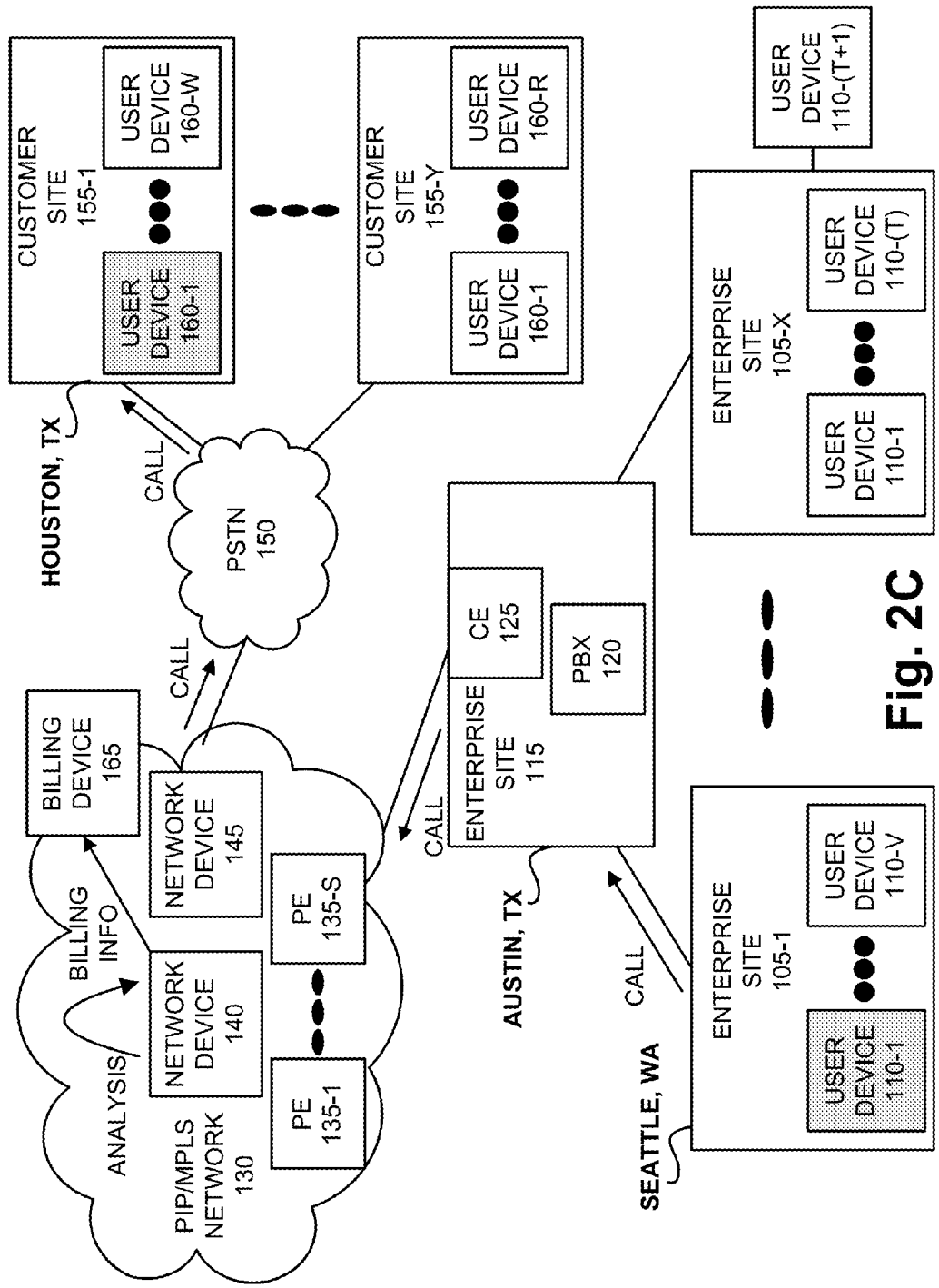

FIGS. 2A-2C illustrate an exemplary scenario in which local identity based on a called number may be provided in the environment depicted in FIG. 1. Referring to FIG. 2A, assume that a user of user device 110-1 in enterprise site 105-1 places a telephone call to a user of user device 160-1 in customer site 155-1. In this example, assume that enterprise site 105-1 is located in Seattle, Wash., enterprise site 115 is located in Austin, Tex. and customer site 155-1 is located Houston, Tex. Also, assume that the user of user device 110-1 is calling from 206-555-3456 and that the user of user device 160-1 has a telephone number of 713-555-2345.

As illustrated, a call message is transmitted from user device 110-1 located in Seattle, Wash. to enterprise site 115. PBX 120 receives, for example, a call connect message that includes the calling number and the called number. According to an exemplary implementation, if the call connect message is not in a format for PIP/MPLS network 130, PBX 120 may convert the call connect message to an IP-based message (e.g., a SIP invite message). Alternatively, a gateway (not illustrated) or CE 125 may convert the call message to an IP-based message or other suitable format. In this example, assume that a SIP invite message is transmitted to network device 140 via CE 125 and PE 135. According to an exemplary implementation, the SIP invite message includes a Diversion header. According to another exemplary implementation, the SIP invite message does not include a Diversion header. According to yet another implementation, the SIP invite message may include another type of header (e.g., a history header, etc.) and/or other data/information field(s), which may be used to carry a billing number. According to this exemplary scenario, it may be assumed that the SIP invite message includes a Diversion header.

Referring to FIG. 2B, network device 140 analyzes the SIP invite message to perform a local identity service. According to an exemplary embodiment, network device 140 inspects the SIP invite message to identify the telephone number of the called party. According to an exemplary implementation, network device 140 identifies information included in the "To" SIP header. According to another implementation, network device 140 may identify information included in the Request-Line-URI that includes the URI of the destination. Network device 140 accesses a database to select an appropriate calling number. An exemplary database is described further below.

Figure 3A:
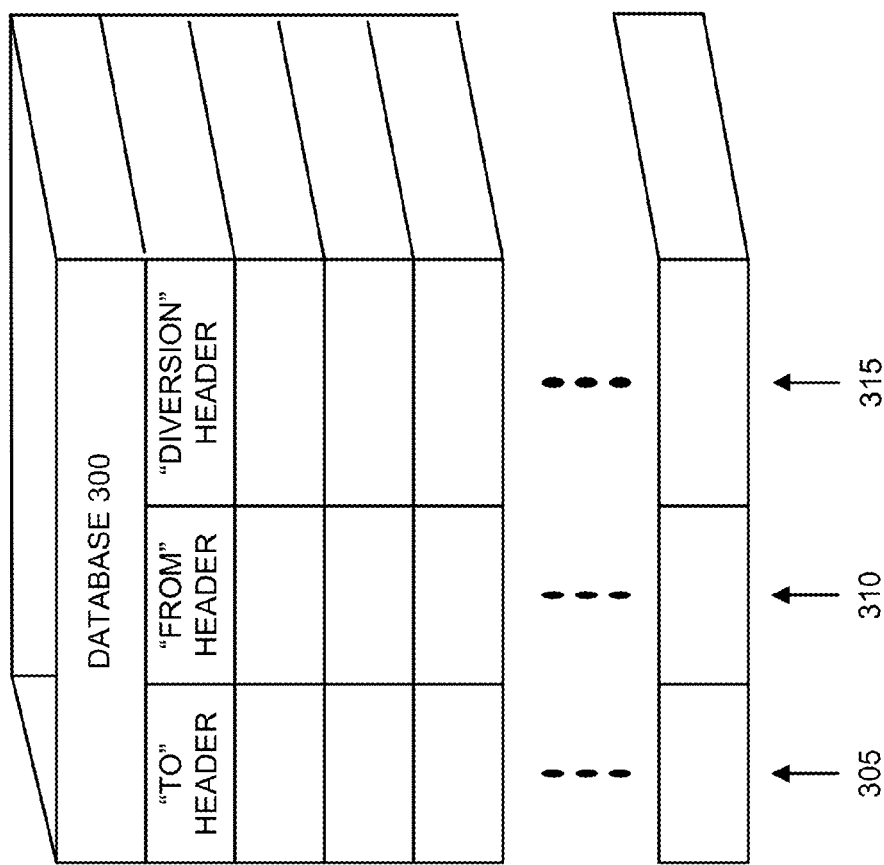
FIG. 3A is a diagram illustrating an exemplary database.

FIG. 3A is a diagram illustrating an exemplary database 300. As illustrated, database 300 includes a "To" header field 305, a "From" header field 310, and a "Diversion" header field 315.

"To" header field 305 indicates a telephone number of the called party. "To" header field 305 may indicate an entire telephone number (e.g. 10 digits) or a portion of a telephone number (e.g., 3 or more digits). "From" header field 310 indicates a telephone number of the calling party. As described further below, the telephone number in "From" header field 310 may serve as the telephone number that the calling party wants to use for the call. Additionally, in instances that, for example, the SIP invite message does not include a Diversion header, the telephone number in "From" header field 310 may be used for billing purposes. "Diversion" header field 315 indicates a telephone number to be used for billing purposes. For example, in instances that, for example, the SIP invite message includes a Diversion header, the telephone number in "Diversion" header field 315 will be used in the Diversion header.

According to other implementations, database 300 may include additional, fewer, and/or different data and/or information fields. For example, according to an exemplary implementation, each record may not include "Diversion" header field. Rather, the telephone number included in "From" header field may serve as both the billing telephone number and the calling party telephone number. Additionally or alternatively, for example, as previously described, according to implementations in which a database is used, depending on the protocols/formats used (e.g., H.323, etc.) suitable data/information fields may store corresponding data/information.

Referring back to FIG. 2B, as previously described, assume that the called telephone number is 713-555-1234. Also, assume that the SIP invite message includes a Diversion header. Network device 140 uses database 300 to select a calling number (e.g., a telephone number to be used in the From header of the SIP invite message) and a billing number (e.g., a telephone number to be used in the Diversion header of the SIP invite message). For example, in FIG. 3B, network device 140 uses the called number as a key for database 300. For example, network device 140 compares at least 3 digits (e.g., 713, etc.) of the called number (e.g., 713-555-2345) to entries in "To" header fields 305 and identifies record 350.

Referring to FIG. 2B, network device 140 replaces "2065553456" in the "From" header field of the SIP message with telephone number indicated in the "From" header field 310 of record 350 (e.g., 713300111@abc.com). Additionally, network device 140 replaces the telephone number in the Diversion header with the telephone number indicated in the "Diversion" header field 315 of record 350 (e.g., 7133001111@abc.com). In this example, the telephone numbers in "From" header field 310 and "Diversion" header field 315 of record 350 are the same. However, according to other records (e.g., record 355), the telephone numbers may be different and may be a customer preference. Network device 140 transmits the modified SIP message to network device 145.

In this example, the modified SIP message is received by network device 145. Referring to FIG. 2C, network device 145 may convert the modified SIP message to a PSTN compatible format. For example, network device 145 may generate and send a Signaling System #7 (SS7) ISDN user part (ISUP) initial address message (IAM) to PSTN 150. The calling number and the called number are included in the ISUP initial address message. A switch (not illustrated) in PSTN 150 replies with an ISUP address complete message to network device 145 and a voice path is established between the user of user device 110-1 and the user of user device 160-1. In this example, assume that the user of user device 160-1 has caller ID service. According to such an example, the user of user device 160-1 will see that the call originated from "7133001111," which is a local telephone number. Additionally, as illustrated in FIG. 2C, network device 140 may send billing information to billing device 165. The company will be charged for the call as if the call is a local call versus long distance. That is, the billing of the call is based on the 713-300-1111 telephone number.

According to other examples, the calling number may be of the same area code or area code and prefix as the called number. Network device 140 may perform a process similar to that described. For example, assume enterprise site 105-X is located in the same city as customer site 155-Y. According to an exemplary implementation, network device 140 may access database 300 and substitute telephone numbers in the Diversion and the From headers based on the called number. According to another example, the SIP invite message does not include the Diversion header. Network device 140 may perform a process similar to that described, except that the From header will serve as both the calling party number and the billing number. According to yet another example, the SIP invite message does not include the Diversion header. Network generates a Diversion header and may perform a process similar to that described.

FIG. 4 is a diagram illustrating exemplary components of a device 400 that may correspond to one or more of the devices in environment 100. As illustrated, according to an exemplary embodiment, device 400 includes a processor 405, memory/storage 410 storing software 415, a communication interface 420, an input 425, and an output 430. According to other embodiments, device 400 may include fewer components, additional components, different components, and/or a different arrangement of components than those illustrated in FIG. 4 and described herein.

Processor 405 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 405 may be implemented as hardware (e.g., a microprocessor, etc.), a combination of hardware and software (e.g., a SoC, an ASIC, etc.), may include one or multiple memories (e.g., memory/storage 410), etc.

Processor 405 may control the overall operation or a portion of operation(s) performed by device 400. Processor 405 may perform one or multiple operations based on an operating system and/or various applications or programs (e.g., software 415). Processor 405 may access instructions from memory/storage 410, from other components of device 400, and/or from a source external to device 400 (e.g., a network, another device, etc.).

Memory/storage 410 includes one or multiple memories and/or one or multiple other types of storage mediums. For example, memory/storage 410 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 410 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 410 may include drives for reading from and writing to the storage medium.

Memory/storage 410 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 410 may store data, software, and/or instructions related to the operation of device 400.

Software 415 includes an application or a program that provides a function and/or a process. Software 415 may include firmware. Communication interface 420 permits device 400 to communicate with other devices, networks, and/or systems. Communication interface 420 may include a wireless interface and/or a wired interface. Communication interface 420 includes a transmitter, a receiver, and/or a transceiver. Communication interface 420 may operate according to one or multiple protocols, standards, and/or the like.

Input 425 provides an input into device 400. For example, input 425 may include a keyboard, a mouse, a display, a touchscreen, a touchless screen, a button, a switch, an input port, speech recognition logic, and/or some other type of visual, auditory, tactile, etc., input component. Output 430 provides an output from device 400. For example, output 430 may include a speaker, a display, a touchscreen, a touchless screen, a light, an output port, and/or some other type of visual, auditory, tactile, etc., output component.

Device 400 may perform processes and/or functions, as described herein, in response to processor 405 executing software 415 stored by memory/storage 410. By way of example, the instructions may be read into memory/storage 410 from another memory/storage 410 or from another device via communication interface 420. The instructions stored by memory/storage 410 may cause processor 405 to perform one or more processes described herein. Alternatively, for example, according to other implementations, device 400 may perform one or more processes described herein based on the execution of hardware (processor 405, etc.), the execution of firmware with hardware, or the execution of software and firmware with hardware.

Figure 5A:
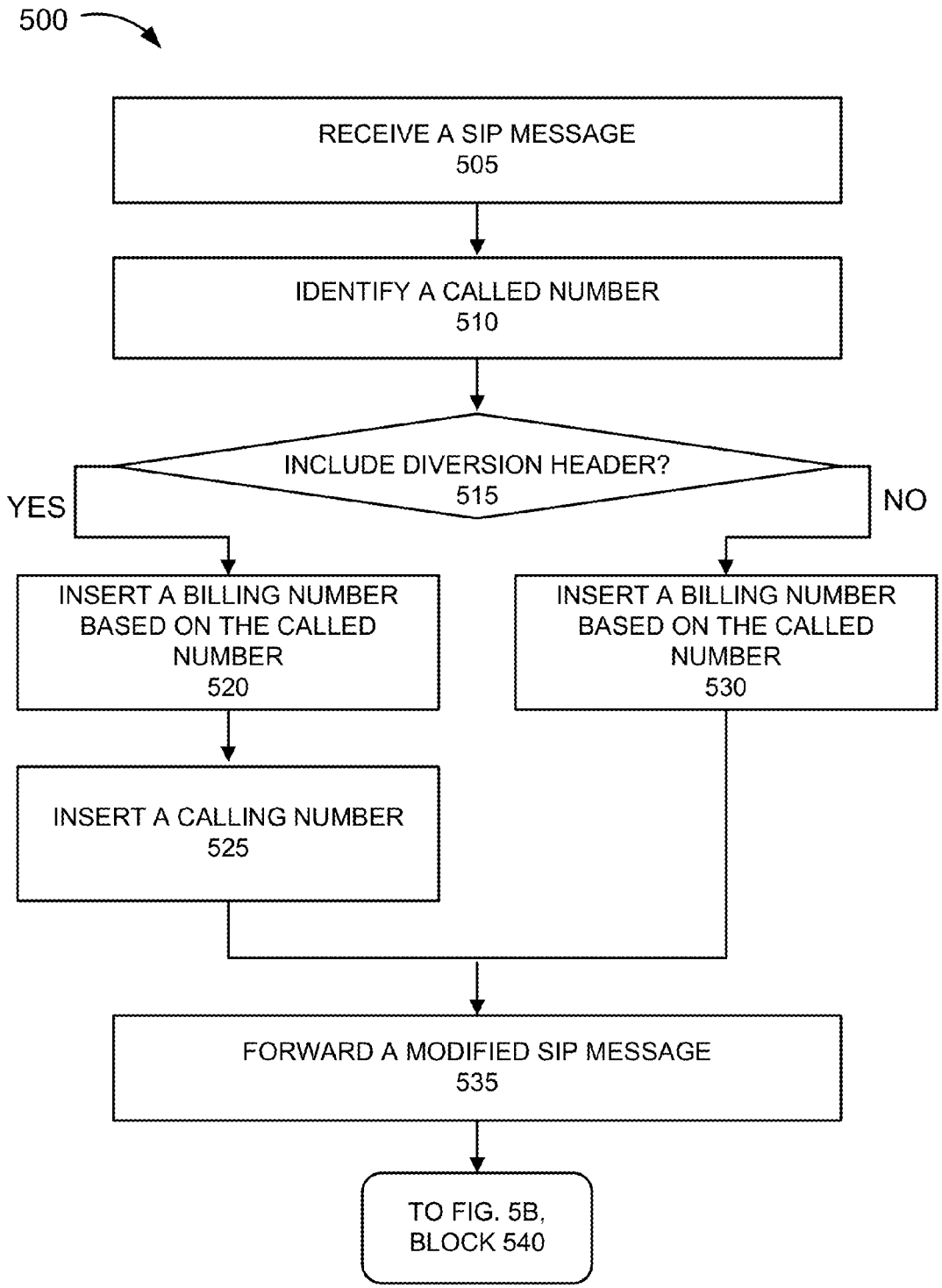
FIGS. 5A and 5B are flow diagrams illustrating an exemplary process for providing local identity based on a called number.
Figure 5B:
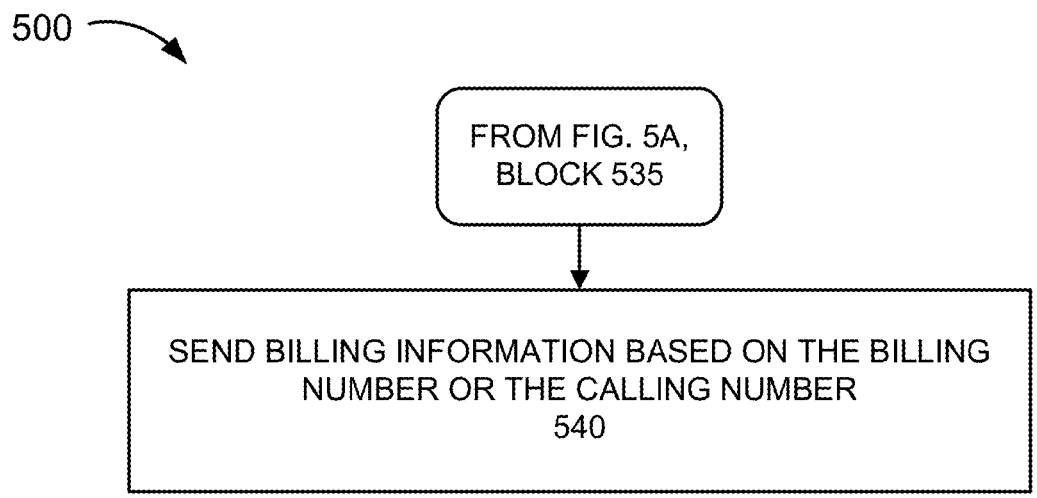

FIGS. 5A and 5B are flow diagrams illustrating an exemplary process for providing local identity based on a called number. According to an exemplary embodiment, network device 140 performs process 500. For example, processor 405 may execute software 415 to perform the steps described.

Referring to FIG. 5A, in block 505, a SIP message is received. For example, network device 140 receives a SIP invite message pertaining to a telephone call. According to an exemplary implementation, the SIP message does not includes a Diversion header. According to another implementation, the SIP message includes a Diversion header.

In block 510, a called number is identified. For example, network device 140 inspects a To field of the SIP header included in the SIP invite message.

In block 515, it is determined whether the SIP message includes a Diversion header. For example, network device 140 inspects the SIP message to identify whether a Diversion header is present. According to other implementations, network device 140 may determine whether the SIP message includes a Diversion header based on other factors (e.g., network address of PBX 120 and/or CE 125, etc.).

If it is determined that the SIP message includes the Diversion header (block 515-YES), a billing number based on the called number is inserted (block 520). For example, network device 140 uses database 300 to select a telephone number for the Diversion header. Network device 140 inserts the selected telephone number in the Diversion header included in the SIP message.

In block 525, a calling number is inserted. For example, network device 140 uses database 300 to select a telephone number (e.g., a calling party number) based on the called number and/or the billing number. Network device 140 inserts the selected telephone number in the From header of the SIP message.

If it is determined that the SIP message does not include the Diversion header (block 515-NO), a billing number based on the called number is inserted (block 530). For example, network device 140 uses database 300 to select a telephone number for the From header. Network device 140 inserts the selected telephone number in the From header included in the SIP message.

In block 535, a modified SIP message is forwarded. For example, network device 140 transmits the modified SIP invite message to network device 145. Network device 145 processes the modified SIP invite message for receipt by PSTN 150.

Referring to FIG. 5B, in block 540, billing information based on the billing number or the calling number is sent. For example, network device 140 sends billing information to billing device 165. Depending on whether the SIP message includes the Diversion header, the billing information is based on the billing number included in the Diversion header or the calling number included in the From header of the SIP message. The call is billed based on the billing number of the calling number.

Although FIGS. 5A and 5B illustrate an exemplary process 500 to provide local identity based on the called number, according to other embodiments, process 500 may include additional operations, fewer operations, and/or different operations than those illustrated in FIGS. 5A and 5B and described herein. For example, although process 500 is described in relation to the Session Initiation Protocol, according to other embodiments, process 500 may include different operations if other protocols and/or formats are used. Additionally, according to other embodiments, PBX 120 or some other network device in a calling path may perform one or more steps of process 500.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIGS. 5A-5B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 405, etc.), a combination of hardware and software (e.g., software 415), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
receiving, by a network device, a message pertaining to a telephone call set-up;
identifying in the message, by the network device, a called telephone number;
determining, by the network device, whether the message includes a Diversion header;
selecting, by the network device, a billing telephone number based on the called telephone number;
inserting, by the network device, the billing telephone number in the Diversion header in response to determining that the message includes the Diversion header;
selecting, by the network device, a calling telephone number based on the called telephone number;
replacing, by the network device, a calling telephone number included in the message with the selected calling telephone number; and
transmitting, by the network device, the message that includes the selected calling telephone number.

2. The method of claim 1, further comprising:
using the selected calling telephone number as the billing telephone number in response to determining that the message does not include the Diversion header.

3. The method of claim 1, further comprising:
generating billing information based on the billing telephone number.

4. The method of claim 1, wherein the message includes a Session Initiation Protocol invite message.

5. The method of claim 1, further comprising:
generating billing information based on the selected calling telephone number.

6. The method of claim 1, wherein the calling telephone number has an area code that is different from an area code of the selected calling telephone number.

7. The method of claim 1, wherein the selected calling telephone number has an area code that is the same as an area code of the called telephone number.

8. A device comprising:
a communication interface;
one or more memories that store instructions; and
one or more processors to execute the instructions to:
receive, via the communication interface, a message pertaining to a telephone call set-up;

identify a called telephone number included in the message;
select a calling telephone number based on the called telephone number;
replace a calling telephone number included in the message with the selected calling telephone number;
determine whether the message includes a Diversion header;
select a billing telephone number based on the called telephone number;
insert the billing telephone number in the Diversion header in response to a determination that the message includes the Diversion header; and
transmit, via the communication interface, the message that includes the selected calling telephone number.

9. The device of claim 8, wherein the one or more processors further execute the instructions to:
use the selected calling telephone number as the billing telephone number in response to a determination that the message does not include the Diversion header.

10. The device of claim 9, wherein the one or more processors further execute the instructions to:
generate billing information based on the selected calling telephone number; and
transmit the billing information, via the communication interface, to a billing device.

11. The device of claim 8, further comprising:
a database that maps a portion of the called telephone number to the selected telephone number,
wherein the one or more processors further execute the instructions to:
use the database to select the calling telephone number.

12. The device of claim 11, wherein the message includes a Session Initiation Protocol invite message.

13. The device of claim 8, wherein the one or more processors further execute the instructions to:
generate billing information based on the billing telephone number; and
transmit, via the communication interface, to a billing device.

14. The device of claim 8, wherein the calling telephone number has an area code that is different from an area code of the selected calling telephone number.

15. The device of claim 14, wherein the selected calling telephone number has an area code that is the same as the area code of the called telephone number.

16. The device of claim 14, comprising an application server that provides a Session Initiation Protocol trunking service for Voice over Internet Protocol (VoIP).

17. A non-transitory storage medium storing instructions executable by a computational device to:
receive a message pertaining to a telephone call set-up;
identify a called telephone number included in the message;
select a calling telephone number based on the called telephone number;
replace a calling telephone number included in the message with the selected calling telephone number;
determine whether the message includes a Diversion header;
select a billing telephone number based on the called telephone number;
insert the billing telephone number in the Diversion header in response to a determination that the message includes the Diversion header; and
transmit the message that includes the selected calling telephone number.

18. The non-transitory storage medium of claim 17, wherein the calling telephone number has an area code that is different from an area code of the selected calling telephone number.

19. The non-transitory storage medium of claim 17, further storing instructions executable by the computational device to:
use the selected calling telephone number as the billing telephone number in response to a determination that the message does not include the Diversion header.

20. A method comprising:
receiving, by a network device, a message pertaining to setting up a telephone call;
identifying, by the network device, a called telephone number in the message;
identifying, by the network device, a format of the message;
selecting, by the network device, a calling telephone number based on the called telephone number in response to identifying that the message is in a first format;
selecting, by the network device, the calling telephone number and a billing telephone number based on the called telephone number, in response to identifying that the message is in a second format, wherein the second format includes a Diversion header and the first format does not;
replacing, by the network device, a calling telephone number included in the message with the selected calling telephone number when the message is in the first format;
replacing, by the network device, the calling telephone number included in the message with the selected calling telephone number and inserting the selected billing telephone number in the Diversion header when the message is in the second format; and
transmitting, by the network device, the message that includes the selected calling telephone number or the selected calling telephone number and the selected billing telephone number.

21. The method of claim 20, further comprising:
generating billing information based on the selected calling telephone number if the message is in the first format; and
generating billing information based on the selected billing telephone number if the message is in the second format.

* * * * *